Dec. 30, 1930.  H. B. GREENING ET AL  1,787,267
VARIABLE SPEED TRANSMISSION
Filed Oct. 26, 1928    3 Sheets-Sheet 2

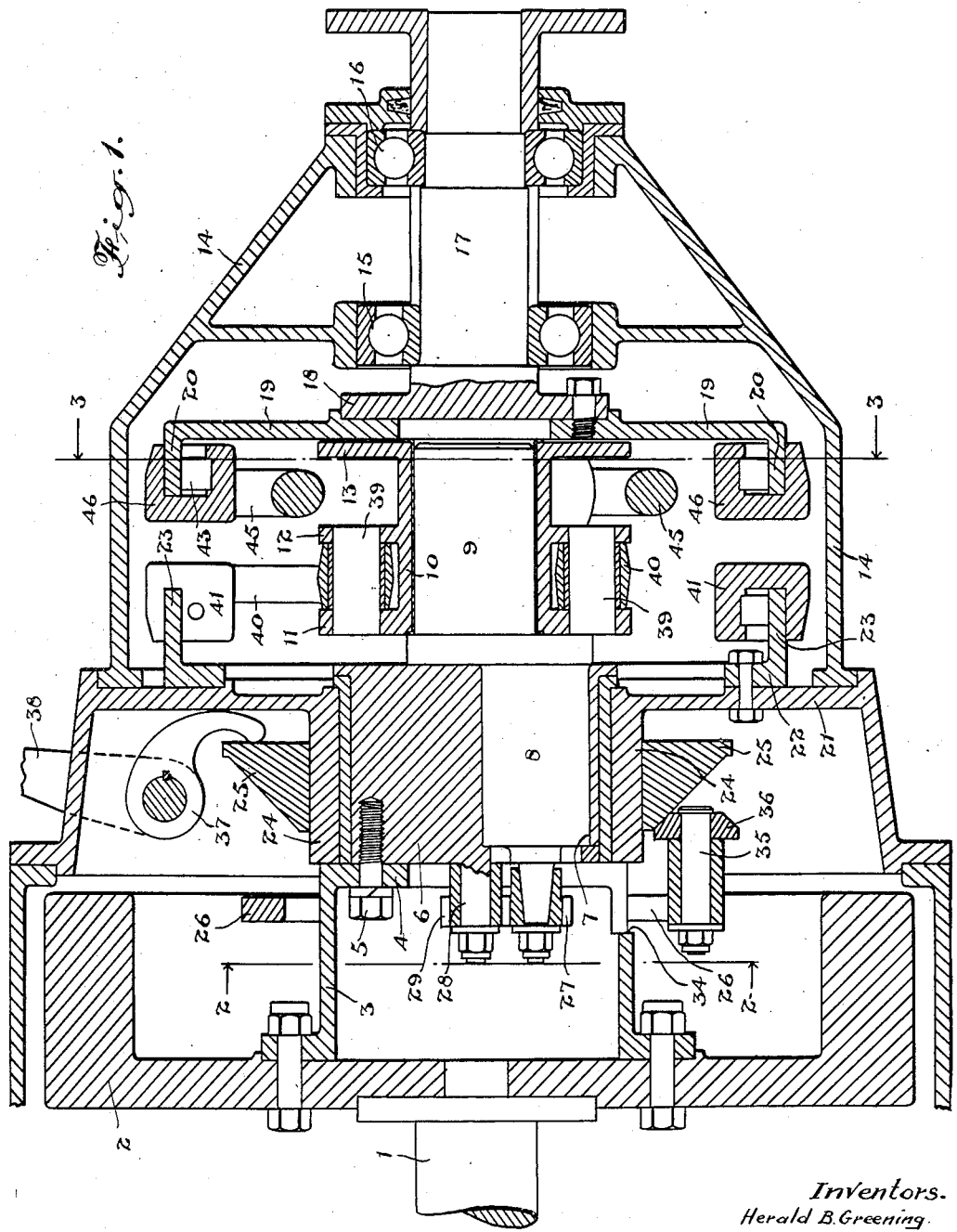

Inventors.
Herald B. Greening.
James W. Galloway.

Patented Dec. 30, 1930

1,787,267

UNITED STATES PATENT OFFICE

HERALD B. GREENING, OF HAMILTON, ONTARIO, CANADA, AND JAMES W. GALLOWAY, OF DETROIT, MICHIGAN, ASSIGNORS TO GALLOWAY ENGINEERING COMPANY, LIMITED, OF HAMILTON, ONTARIO, CANADA

VARIABLE-SPEED TRANSMISSION

Application filed October 26, 1928. Serial No. 315,190.

The principal objects of the invention are, to provide a mechanism which will operate to transmit power from the driving to a driven shaft at varying speeds while maintaining a constant operative connection.

A further object is to devise a structure of simple form which will be very positive in its action.

The principal feature of the invention consists in the novel construction and arrangement of parts, whereby power is applied to the driven shaft with varying speed and torque through a plurality of connection members rotatable about an eccentrically disposed crank pin, and whereby the eccentricity of said crank pin may be varied at will.

In the drawings, Figure 1 is a longitudinal sectional view through the line 1—1, Figure 2.

Figure 3:
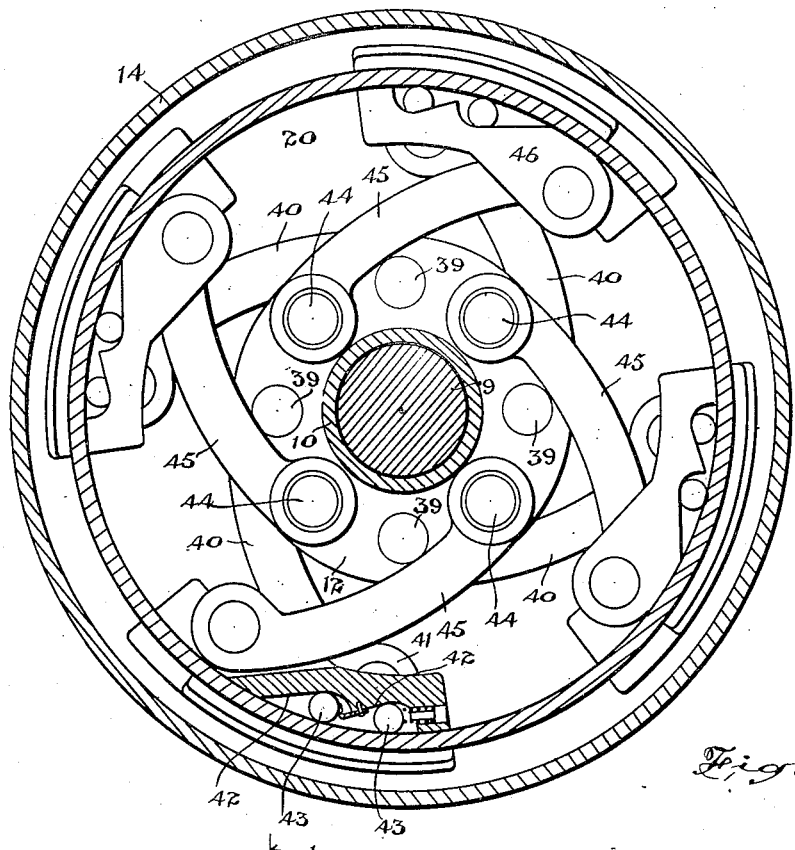
Figure 3 is a cross sectional elevational view through the device on the line 3—3 of Figure 1.
Figure 2:
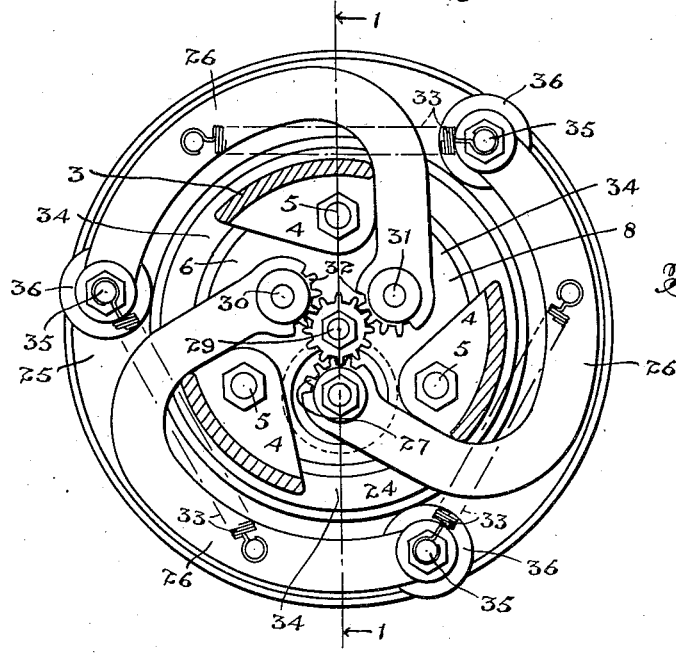
Figure 2 is a sectional elevational view taken on the line 2—2 of Figure 1.
Figure 4:
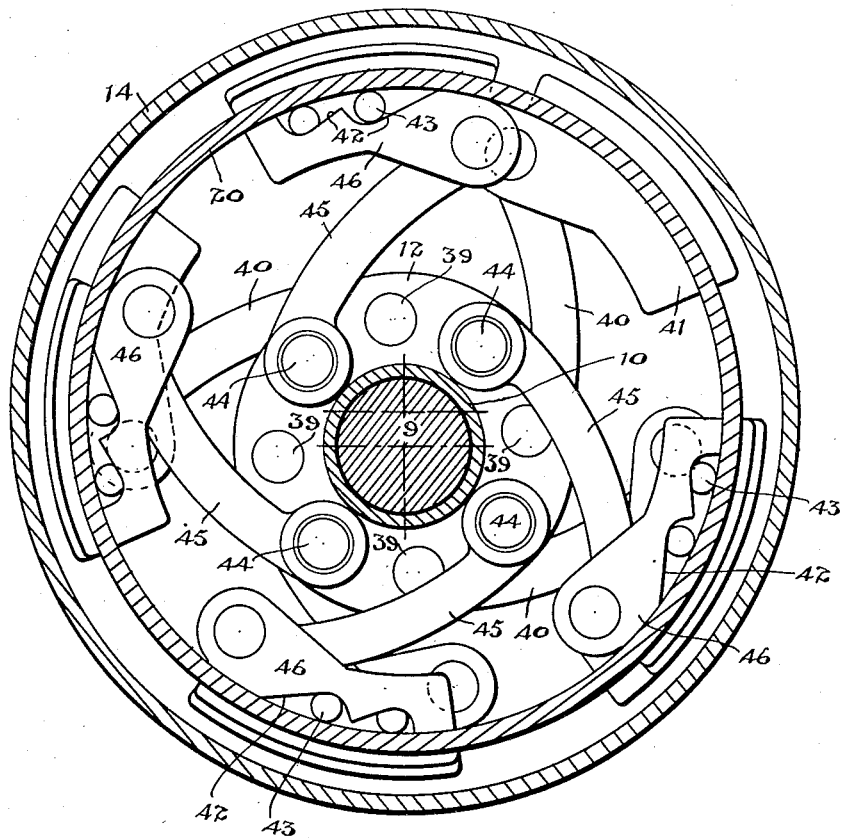
Figure 4 is a view similar to Figure 3 showing the relative position of the parts with the crank pin shifted in its relation to the driving shaft.

In the accompanying drawings, the driving shaft 1 is shown connected to a fly wheel 2 upon which is rigidly mounted a sleeve 3.

The sleeve 3 is formed with a plurality of inturned lugs 4 through which the cap screws 5 extend into an axially disposed hub 6.

The hub 6 is formed with a bearing 7 arranged eccentric to the axis of the main or driving shaft and hub.

A stud member 8 is rotatably mounted in the bearing 7 and has a crank extension 9 upon which is mounted a ring member 10 provided with flanges 11, 12 and 13.

A casing 14 encloses the mechanism and carries the journal bearings 15 and 16 in which the driven shaft 17 is mounted.

The inner end of the driven shaft is provided with a flange 18 and a flanged ring 19 which is provided with an inturned flanged edge 20.

A ring structure 21 forms part of the casing 14 and carries a ring 22, the flange 23 of which corresponds with and extends inwardly toward the flange 20 of the ring 19.

The ring 21 which is rigid with the outer casing carries a central sleeve portion 24 upon which is rotatably mounted the wedge ring 25 and said sleeve portion forms a bearing for the hub 6 which rotates centrally therein.

The stud 8 mounted in the hub 6 has secured to its inner end a curved arm 26, the hub of which is formed with a toothed gear 27.

A stud 28 is arranged axially of the hub 6 and an idler gear 29 is mounted on the stud 28 and meshes with the gear 27.

The studs 30 and 31 are also rigidly secured in the hub 6 and tooth geared segments 32 meshing with the idler gear 29 have curved extensions or arms similar to the curved arm 26.

Coil tension springs 33 are secured at one end to the free ends of the curved arms to draw them inwardly, the other end of the springs being secured at a suitable point to the adjacent arms or they may be attached directly to the fly wheel or sleeve 3 in any well known manner if desired. The inner ends of the arms extend through the slots 34 in the sleeve 3 between the lugs 4 and the co-operative movement of the arms effects the rotation of the stud 8 journalled in the hub 6.

The free ends of the curved arms 26 have supported thereon the studs 35 on which are rotatably mounted the bevelled rollers 36.

The rollers 36 are engaged by the wedge ring 25 so that as the wedge ring is moved longitudinally on its bearing sleeve 24 the arms 26 will be turned on their pivots to alter the position of the stud 8.

This movement of course rotates the crank 9 and changes the relative position of the axis of the ring 10.

A suitable means is provided preferably in the form of a forked or fork lever 37 for shifting the position of the wedge ring 25, said fork lever being here shown manipulated by a hand lever 38 extending beyond the casing ring.

A plurality of pins 39 are secured between the flanges 11 and 12 of the ring 10 and upon each of these pins is mounted a curved arm 40 which extends substantially tangentially from said pins.

Clutch shoes 41 are pivotally secured to the free ends of the arms 40.

The clutch shoes 41 are grooved in one side to slidably receive the flange 23 and the shoes are under-cut with the bevelled recesses 42 in which are mounted the clutch rollers 43 which engage the bevelled surfaces of the recesses and the inner face of the flange 23 to grip the flange.

A plurality of pins 44 are secured between the flanges 12 and 13 of the ring 10 and each of these carry a pivotal arm 45, said arms extending tangentially from their pivotal points in the flanges 12 and 13 and in the opposite direction to the direction of the arms 40.

The free ends of the arms 45 are provided with clutch shoes 46 similar to the shoes 41, said shoes 46 engaging the flange 20 of the ring 19 carried by the driven shaft.

In the operation of the device the rotation of the driving shaft and fly wheel rotates with it the sleeve 3 and the hub 6 which carries with it the crank stud 8, the crank member or extension 9 of which rotates about the axial centre of the driving shaft.

When the position of the curved arms 26 and 40 is altered by the operation of the fork lever 37 and the wedge ring 25, the turning of the stud 8 in its bearing will throw the crank member 9 off the axial centre.

When the crank 9 is rotating coincident with the axis of the driving shaft the sleeve 10 will remain in a fixed position while the crank 9 simply rotates therein but immediately upon the shifting of the wedge ring 25 by the operation of the forked lever 37 the curved arms 26 and 40 are rotated to effect the turning of the stud 8 in its bearing, consequently altering the position of the axis of the crank or crank pin 9.

The ring 10 is thus carried in an eccentric path about the axial line of the shaft and the rotation of the sleeve 10 about the crank pin is governed by the amount of eccentricity of the crank pin 9 in relation to the axis of the main shaft.

The full freedom of rotation of the ring 10 about the crank 9 relative to the fixed casing is prevented by the locking of the clutch shoes carried by the arms 40 upon the fixed flange 23, which locking effect takes place progressively from one shoe to the next as the crank revolves. Similarly the clutch shoes 46 of the pivotal arms 45 engage and grip the flange 20 of the ring 19 connected to the driven shaft, thus imparting a rotary motion to the driven shaft 17.

It will be understood that as each of the shoes 41 carried by the arms 40 become locked upon the stationary flange or ring, the bearings of the arms in the movable ring each form a fulcrum upon which the sleeve revolves and the corresponding shoe on one of the arms 45 becoming locked on the movable ring 20 effects the rotation of the ring 20 and consequently the driven member.

It will be seen that as the eccentricity of the crank 9 is altered in relation to the axis of the driving shaft the leverages of the gripping arms will change so that the torque ratio between the driving and driven parts will be altered, the torque being the inverse of the speed, consequently the input power and the output power remain equal irrespective of the change in torque or speed.

The most important feature of this invention is that it permits a free fluctuation in speed at either the driving or driven end and enables the manipulation of the mechanism to change the torque.

A device such as described is extremely desirable as it will permit the control of the speed of the driven member and the changing of such speeds without disconnecting the driving force from the driven member.

What we claim as our invention is:

1. In a variable speed transmission, the combination with a stationary element and the driving and driven members, of concentrically arranged clutch rings carried respectively by said stationary element and driven member, a plurality of clutch elements engaging each of said rings, transmission means for supporting said clutch elements adapted to transmit power from the driving to the driven member, and manually controllable means carried by the driving member adapted during the operation of the latter to be controlled to govern the relative working positions of said clutch transmission means in accordance with torque requirements independent of the speed of rotation of said driving member.

2. In a variable speed transmission, the combination with a casing and the driving and driven members supported therein, of concentrically arranged clutch rings carried respectively by said casing and driven member, a plurality of clutch elements engaging each of said rings, transmission means for supporting said clutch elements adapted to transmit power from the driving to the driven member, means carried by the driving member for altering the relative position of said clutch transmission means, spring means for holding said altering means inoperative against centrifugal action, and manually operable means adapted to engage and operate said altering means during the operation of said driving member to definitely govern the relative position of said transmission means independent of the speed of operation of said driving member.

3. In a variable speed transmission, the combination with a stationary element and the driving and driven members supported therein, of concentrically arranged clutch rings carried respectively by said stationary element and driven member, a plurality of clutch elements engaging each of said rings, transmission means for supporting said clutch elements adapted to transmit power from the driving to the driven member, pivotal means carried by said driving member, means connecting said pivotal means to said transmission means and adapted to alter the relative position of said transmission means to effect a change in the ratio of movement between the driving and driven members, a bevelled ring slidable longitudinally of the driving member and adapted to engage the pivotal means to rotate same to effect a change in the relation of the transmission means and means for sliding said bevelled ring longitudinally.

4. In a variable speed transmission, the combination with the stationary element and driving and driven members, of flange rings secured respectively to the stationary element and driven member, a crank member carried by the driving member and rotatable therein, a ring rotatably mounted on the crank member, clutch arms pivotally mounted on said crank ring, a clutch shoe connected to each clutch arm, said arms and shoes being arranged in oppositely disposed groups to engage respectively the stationary flange ring and the flange ring carried by the driven member, a plurality of operating arms pivotally mounted on the driving member operatively connected with said crank member to alter its eccentricity in relation to the driving member, a cone ring slidable longitudinally of the driving member and adapted to engage the outer ends of the cooperating arms carried by the driving member, and manually operable means for sliding said cone ring.

5. A variable speed transmission, comprising in combination driving and driven members, a stationary or fixed casing, the driving member carrying a journal bearing portion having an eccentrically offset bearing, a crank rotatably mounted in said bearing in the driving member, a ring rotatably mounted on the crank, a plurality of arms with connected clutch shoes and arranged in a set on said ring, the shoes thereof engaging a flange on the fixed casing to interlock therewith and hold said ring in progressive relative positions, a plurality of clutch arms arranged on said ring in a group disposed to operate in the opposite direction to the aforesaid arms, a clutch shoe connected to each of said latter clutch arms and engaging the driven member, an operating arm secured to the end of the crank mounted in the driving member, a plurality of operating arms pivotally mounted on the driving member and operatively connected with the arm connected to said crank, a bevelled ring surrounding the journal bearing portion of the driving member and longitudinally slidable and adapted to engage the ends of said operating arms to spread them outwardly and to rotate the crank in said journal to change the position of the crank carrying the clutch arms, a fork lever mounted in the fixed casing and operable from the exterior and engaging said bevelled ring to move it into contact with and to spread said operating arms, and spring means for returning the operating arms to their inward position.

6. In a variable speed transmission, the combination with a stationary element and the driving and driven members, of concentrically arranged clutch rings carried respectively by said stationary element and driven member, a plurality of clutch elements engaging each of said rings, transmission means for supporting said clutch elements adapted to transmit power from the driving to the driven member, and manually controllable means carried by the driving member adapted to definitely vary the relative working positions of said clutch transmission means during the operation of said driving member in accordance with the torque requirements independent of the speed of rotation of said driving member.

7. In a variable speed transmission, the combination with a stationary element and the driving and driven members, of concentrically arranged clutch rings carried respectively by said stationary element and driven member, a crank rotatably mounted in said driving member, a plurality of clutch elements operatively mounted on said crank and engaging said rings, and manually operable means mounted on said driving member for effecting a positive rotation of said crank in the driving member during the operation of said driving member to alter the relative spacing of the crank axis from the axis of the driving member.

8. In a variable speed transmission, the combination with a stationary element and the driving and driven members, of concentrically arranged clutch rings carried respectively by said stationary element and driven member, a crank rotatably mounted in said driving member, a plurality of clutch elements operatively mounted on said crank and engaging said rings, manually operable means mounted on said driving member for effecting a positive rotation of said crank in the driving member in one direction during the operation of said driving member, and spring means for effecting the rotation of said crank in the reverse direction.

HERALD B. GREENING.
JAMES W. GALLOWAY.